United States Patent Office 3,405,163
Patented Oct. 8, 1968

3,405,163
TRIFLUOROMETHYL DIONES
Ronald E. Bambury, Kenneth K. Wyckoff, and David M. Tennent, Ashland, Ohio, assignors to Richardson-Merrell Inc., New York, N.Y., a corporation of Delaware
No Drawing. Filed Aug. 26, 1965, Ser. No. 482,907
10 Claims. (Cl. 260—469)

ABSTRACT OF THE DISCLOSURE

A compound of the formula:

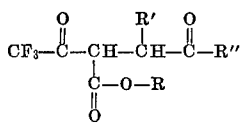

wherein R is a member selected from the group consisting of lower alkyl, cyclopropyl, cyclobutyl, cyclohexyl, phenyl, naphthyl, phenylalkyl having 7 to 14 carbon atoms; and naphthylalkyl having from 11 to 14 carbon atoms; and each of R' and R" is a member selected from the group consisting of hydrogen, lower alkyl, cyclopropyl, cyclobutyl, cyclohexyl, phenyl, naphthyl, phenylalkyl having 7 to 14 carbon atoms, and naphthylalkyl having from 11–14 carbon atoms. These compounds have utility as solvents, chelating agents for heavy metals, and as chemical intermediates.

---

This invention relates to novel trifluoromethyl diones and their method of preparation. More particularly, this invention relates to trifluoromethyl diones (or simply diones of the formula:

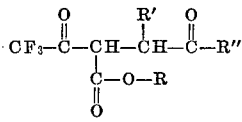

Formula I wherein R is alkyl, aryl, cycloalkyl or aralkyl; and each of R' and R" is hydrogen, alkyl, aryl, cycloalkyl or aralkyl.

The novel diones of this invention have utility as solvents, chelating agents for heavy metals and as chemical intermediates. As chemical intermediatese they provide a route for the preparation of various furan derivatives having a trifluoromethyl substituent on a carbon atom adjacent to the heterocyclic oxygen.

The diones of his invention are prepared by reacting (a) an alkali metal enolate salt of a trifluoroketo compound of the formula

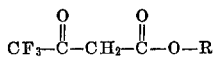

Formula II wherein R has the same meaning as the above generic Formula I, (b) with an α-haloketone in the presence of a catalytically effective quantity of an alkali metal iodide. The enolate salt can be prepared in the reaction medium or it can be preformed. The α-haloketone reactant can be represented by the formula:

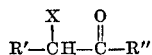

wherein each of R' and R" have the same meaning as in the above generic Formula I and X is a halogen having an atomic number greater than 9, i.e., chlorine, bromine or iodine. The reaction for preparing the novel diones can be illustrated as follows:

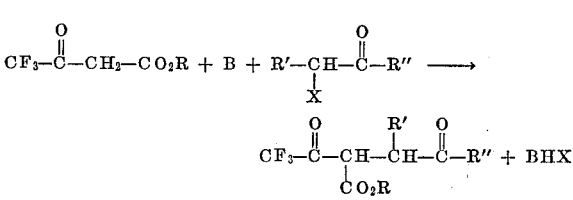

wherein each of R, R', X and R" have the same meaning given above and B is a strong alkali metal base.

The reactions for the preparation of the novel diones are preferably conducted in an inert solvent such as various hydrocarbons, ketones, ethers, and the like, for example, benzene, toluene, glyme, diglyme, acetone, ether, and the like. The temperatures at which the reactions are conducted can vary over a wide range such as that of about 20° C. to about 150° C. The ratio of reactants employed is not critical. Thus the quantity of α-haloketone can vary from about 0.5 to 2.0 moles for each mole of the trifluoroketone reactant. The enolate salt can be prepared by conventional techniques, such as by contacting a strong alkali metal base, e.g., a sodium or potassium hydride alkoxide, hydroxide or amide with an equal molar quantity of the trifluoroketo reactant. The novel diones can be isolated by conventional techniques.

A preferred method for preparing the diones of this invention is as follows: To a solution of a trifluoroketone reactant in about one to ten volumes of an inert solvent is added an equal molar quantity of strong alkali metal base. At this point the solvent may be removed and the enolate salt isolated and another solvent can replace the solvent used during the preparation of the enolate ion. A catalyst of an alkali metal iodide is then added in an amount of about 0.01–0.2 mole, based on the trifluoroketone reactant. The α-haloketone is then added, in an amount which can vary from about 0.5 to about 2.0 moles per mole of the trifluoroketone reactant. The mixture is allowed to react at a temperature which may vary from about room temperature to the boiling point of the solvent used in the reaction until the concentration of the dione product has reached a maximum. The reaction can be followed by standard analytical techniques such as gas-liquid chromatography, ultraviolet, thin layer chromatography, etc. The dione is then isolated by conventional techniques, e.g., fractional distillation of the reaction mixture or by treatment of the reaction mixture with water, extraction of the product from the aqueous phase and separation of the product from the extractant by fractional distillation. The product can also be isolated from the reaction mixture as a metal chelate and regenerated from the chelate by standard methods.

Illustrative of the α-haloketone reactants for preparing the diones of this invention, there can be mentioned: α-chloroacetone; α-bromoacetone; α-iodoacetone; 3-bromobutanone; 2 - bromo - 2 - phenylacetophenone; bromoacetaldehyde; 2-bromobutyraldehyde; α-bromopropiophenone; 1-chloro-1-phenylacetone; 2-bromopentanone-3; 1-chlorobutanone; 2-bromohexanone-3; 3-benzyl-3-bromobutanone; 2-chloro-2-cyclohexylacetophenone; and 5-keto-4-chlorononane.

Illustrative of the trifluoroketo reactants, there can be mentioned various esters of 4,4,4-trifluoroacetoacetic acid, such as those of: alkyls, for example, methyl, ethyl, propyl, butyl, isobutyl, n-pentyl and the like; carbocyclic aryls, such as phenyl, α-naphthyl or β-naphthyl; and carbocyclic aralkyls having from 7 to 14 carbon atoms such as those of benzyl, phenethyl, phenylpropyl, α-naphthylmethyl, β-naphthylethyl, and the like.

In the above generic Formula I, i.e.,

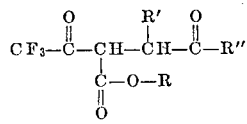

R can be lower alkyl, aryl, cycloalkyl or aralkyl, whereas each of R' and R" can be hydrogen or one of the groups mentioned for R. Illustrative of suitable groups as can be represented by R, R' and R" there can be mentioned: lower alkyls, i.e., alkyls having from 1 to 6 carbon atoms, and particularly alkyls of from 1 to 3 carbon atoms, e.g., methyl, ethyl, propyl, isopropyl, n-butyl, isobutyl, etc.; carbocyclic aryls having from 6 to 10 carbon atoms, i.e., phenyl or naphthyl; carbocyclic aralkyls of phenyl or naphthyl having from 7 to 14 carbon atoms in the alkyl group, e.g., benzyl, phenethyl, phenylpropyl, α-naphthylmethyl, β-naphthylethyl, etc.; and cycloaliphatics having from 3 to 6 carbon atoms, such as cyclopropyl, cyclobutyl, cyclohexyl, etc. In the preferred diones of this invention R' is hydrogen whereas each of R and R" is lower alkyl. Advantageously, R" is methyl since this permits conversion to aldehydes of further intermediate furan compounds after halogenation of the methyl group. Illustrative of the novel diones of this invention, there can be mentioned: 3-carbethoxy-1,1,1-trifluorohexane-2,5-dione; phenyl 3-acetyl-2-trifluoroacetylpropionate; benzyl 3-acetyl-2-trifluoroacetylpropionate; cyclohexyl 3-acetyl-2-trifluoroacetylpropionate; 3-carbethoxy-4-methyl-1,1,1-trifluorohexane - 2,5 - dione; ethyl 3-benzoyl-3-phenyl-2-trifluoroacetylpropionate; 3-carbethoxy-3-trifluoroacetylpropionaldehyde; 3 - carbethoxy-2-ethyl-3-trifluoroacetylpropionaldehyde; and the like.

The novel diones of this invention have a number of utilities. Thus, they can be used as solvents for various aromatic compounds such as diphenylamines, phenyl salicylate, benzophenone and the like, e.g., at least one part of diphenylamine dissolves in about 3 parts of 3-carbethoxy-1,1,1-trifluorohexane-2,5-dione.

The novel diones of this invention are also chelating or complexing agents for heavy metal ions such as those of zinc, copper, nickel, iron, chromium, manganese, cobalt, etc. Illustratively, a copper chelate of 3-carbethoxy-1,1,1-trifluorohexane-2,5-dione can be prepared by contacting two molar equivalents of the dione with an ethanolic solution containing one molar equivalent of copper nitrate. Evaporation of the alcohol of the above mixture gave a green powdery chelate. Similarly, chelates of other diones and heavy metals can be prepared. The chelating properties of the diones have a number of uses. Illustratively, they can be used as chelating agents in chemical analysis by techniques well known in the art.

The diones of this invention have a number of interesting properties. The trifluoromethyl group imparts stability to the dione. Attempts to hydrolyze the diones have been unsuccessful. Attempted acid hydrolysis of the diones gives heterocyclic compounds of the formula:

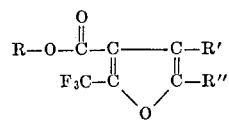

Formula III wherein R, R' and R" have the same meaning as in generic Formula I. Attempted basic hydrolysis of the diones causes a cleavage of the dione chain between the trifluoroacetyl group and the adjacent carbon atom. Illustratively, attempted basic hydrolysis of 3-carbethoxy-1,1,1-trifluorohexane-2,5-dione gave ethyl levulinate.

The furan derivatives of Formula III can be used as solvents for various aromatic compounds, e.g., benzophenone, and as chemical intermediates. Thus, as a chemical intermediate, ethyl 5-methyl-2-trifluoromethyl-3-furoate can be brominated with N-bromosuccinimide to prepare ethyl 5-bromomethyl-2-trifluoromethyl-3-furoate and ethyl 5-dibromomethyl-2-trifluoromethyl-3-furoate. These brominated derivatives have in vitro antibacterial activity and can be converted to the corresponding aldehyde, i.e., ethyl 2-formyl-5-trifluoromethyl-4-furoate, by conventional techniques, e.g., reaction with sodium salt of 2-nitropropane in ethanol. In turn, the aldehyde can be reacted with various hydrazines and hydrazides in a manner similar to the reaction of 5-nitrofurfural with hydrazines and hydrazides, to prepare the corresponding 4-carbethoxy-5-trifluoromethylfurfural derivative. Illustratively, 4-carbethoxy-5-trifluoromethylfurfural semicarbazone; 4-carbethoxy-5-trifluoromethyl-2-furfural thiosemicarbazone; and 4-carbethoxy-5-trifluoromethyl-2-furfural oxime can be prepared by reacting 4-carbethoxy-5-trifluoromethylfurfural with semicarbazide, thiosemicarbazide, and hydroxylamine, respectively. Additionally, the ethyl 5-methyl-2-trifluoromethyl-3-furoate can be converted to the corresponding carboxylic acid (5-methyl-2-trifluoromethyl-3-furoic acid) by hydrolysis. This acid can then be decarboxylated by heating in an inert solvent at a temperature of about 200° C. to prepare 2-methyl-5-trifluoromethylfuran which has solvent activity similar to furan and can also be treated in the same manner as ethyl 5-methyl-2-trifluoromethyl-3-furoate to prepare corresponding furfural derivatives such as 5-(tri-fluoromethyl)-2-furfural semicarbazone, 5-trifluoromethyl-2-furfural thiosemicarbazone and N-[1-(5-trifluoromethyl-2-furyl)ethylidene]-3-amino-2-oxazolidinone. The hydrazine and hydrazide derivatives of the above mentioned furfurals can be used in much the same manner as the corresponding hydrazine and hydrazide derivatives of 5-nitrofurfural, e.g., as antibacterial agents.

The following examples are illustrative of this invention.

Example 1

To a stirred mixture of 8.6 g. (0.2 mole) of a 56% oil dispersion of sodium hydride and 100 ml. of anhydrous 1,2-dimethoxyethane was added, under anhydrous conditions, 36.8 g. (0.2 mole) of ethyl trifluoroacetoacetate over a 15-minute period. The mixture spontaneously heated up to the reflux temperature during the addition. The mixture was heated to maintain a gentle reflux until a clear solution was obtained and hydrogen evolution had ceased. Next 0.1 g. NaI was added and the solution was stirred an additional 5 minutes. Then 19.5 g. (0.21 mole) of chloroacetone was added over a 15-minute period. The mixture was refluxed and stirred for 5 hours after which it was filtered to remove the sodium chloride. The salt cake was washed with ether and the filtrate and washings were combined and evaporated. The residual oil was distilled using a 6-inch Vigreaux column at 0.9 mm. pressure. The material boiling between 70 and 73° C., $n_D^{25}$ 1.4010 was collected giving 17.1 g. (35% yield) of the desired product, 3-carbethoxy-1,1,1-trifluorohexane-2,5-dione. This product gave a positive ferric chloride test and showed one major peak on V.P.C. analysis.

Analysis.—Calcd. for $C_9H_{11}F_3O_4$: C, 45.1; H, 4.62; F, 23.7. Found: C, 45.2; H, 4.74; F, 23.8.

Example 2

To a stirred mixture of 6.8 g. (0.2 mole) of a 56% oil dispersion of sodium hydride and 100 ml. of anhydrous benzene was added 36.8 g. (0.2 mole) of ethyl trifluoroacetoacetate over a 15-minute period. The mixture spontaneously heated up to the reflux temperature during the addition. The mixture was heated to maintain a gentle reflux until a clear solution of the sodium enolate salt of ethyl trifluoroacetoacetate was obtained and hydrogen evolution had ceased. The benzene was removed and acetone was added to the reaction mixture. Next, 0.1 g. of sodium iodide was added and the solution was stirred an additional 5 minutes. Then 19.5 g. (0.21 mole) of chloroacetone was added. The mixture was refluxed for 68 hours and gave a 64% yield of 3-carbethoxy-1,1,1-trifluorohexane-2,5-dione.

Example 3

Following the procedure of Example 1, there can be prepared: (a) phenyl 3-acetyl-2-trifluoroacetylpropionate; (b) benzyl 3-acetyl-2-trifluoroacetylpropionate; and (c) cyclohexyl 3-acetyl-2-trifluoroacetylpropionate by substituting, respectively, the phenyl, benzyl and cyclohexyl trifluoroacetoacetate in place of ethyl trifluoroacetoacetate.

Example 4

A mixture of 8.6 g. (0.2 mole) of a 56% oil dispersion of sodium hydride in 100 ml. of dry benzene is stirred under anhydrous conditions during the addition of 36.8 g. (0.2 mole) of ethyl trifluoroacetoacetate (15-minute addition period). After heating at reflux temperature for 30 minutes, the benzene is removed in vacuo and 100 ml. of dry acetone is added to the residual salt. The addition of a catalytic amount of sodium iodide (0.1 g.) is followed by the dropwise addition of 30.2 g. (0.2 mole) of 3-bromobutanone. The stirred mixture is heated at reflux temperature for six hours. After pouring the reaction mixture into 300 ml. of ice water, the aqueous phase is extracted with four 100-ml. portions of ethyl ether. The combined extracts are dried over anhydrous magnesium sulfate. After removal of the drying agent by filtration, the filtrate is concentrated by distillation. The residue is purified by vapor phase chromatography (column) to give 33.0 g. (65%) of a colorless liquid product of 3-carbethoxy-4-methyl-1,1,1-trifluorohexane-2,5-dione.

Example 5

A mixture of 8.6 g. (0.2 mole) of a 56% oil dispersion of sodium hydride in 100 ml. of dry benzene is stirred under anhydrous conditions during the addition of 36.8 g. (0.2 mole) of ethyl trifluoroacetoacetate (15-minute addition period). After heating to reflux for 30 minutes, the benzene is removed in vacuo and 100 ml. of dry acetone is added to the residual salt. The addition of a catalytic amount of sodium iodide (0.1 g.) is followed by the dropwise addition of 55.0 g. (0.2 mole) of 2-bromo-2-phenylacetophenone. The stirred mixture is heated at reflux temperature for six hours. After pouring the reaction mixture into 300 ml. of ice water, the aqueous phase is extracted with four 100-ml. portions of ethyl ether. The combined extracts are dried over anhydrous magnesium sulfate. After removal of the drying agent by filtration, the filtrate is concentrated by distillation. The residue is purified by vapor phase chromatography (column) to give 37.8 g. (52%) of a colorless liquid product of ethyl 3-benzoyl-3-phenyl-2-trifluoroacetylpropionate.

Example 6

A mixture of 8.6 g. (0.2 mole) of a 56% oil dispersion of sodium hydride in 100 ml. of dry benzene is stirred under anhydrous conditions during the addition of 36.8 g. (0.2 mole) of ethyl trifluoroacetoacetate (15-minute addition period). After heating to reflux for 30 minutes, the benzene is removed in vacuo and 100 ml. of dry acetone is added to the residual salt. The addition of a catalytic amount of sodium iodide (0.1 g.) is followed by the dropwise addition of 24.6 g. (0.2 mole) of bromoacetaldehyde. The stirred mixture is heated at reflux temperature for six hours. After pouring the reaction mixture into 300 ml. of ice water, the aqueous phase is extracted with four 100-ml. portions of ethyl ether. The combined extracts are dried over anhydrous magnesium sulfate. After removal of the drying agent by filtration, the filtrate is concentrated by distillation. The residue is purified by vapor phase chromatography (column) to give 27.0 g. (60%) of a colorless liquid product of 3-carbethoxy-3-trifluoroacetylpropionaldehyde.

Example 7

A mixture of 8.6 g. (0.2 mole) of a 56% oil dispersion of sodium hydride in 100 ml. of dry benzene is stirred under anhydrous conditions during the addition of 36.8 g. (0.2 mole) of ethyl trifluoroacetoacetate (15-minute addition period). After heating to reflux for 30 minutes, the benzene is removed in vacuo and 100 ml. of dry acetone is added to the residual salt. The addition of a catalytic amount of sodium iodide (0.1 g.) is followed by the dropwise addition of 30.2 g. (0.2 mole) of 2-bromobutyraldehyde. The stirred mixture is heated at reflux temperature for six hours. After pouring the reaction mixture into 300 ml. of ice water, the aqueous phase is extracted with four 100-ml. portions of ethyl ether. The combined extracts are dried over anhydrous magnesium sulfate. After removal of the drying agent by filtration, the filtrate is concentrated by distillation. The residue is purified by vapor phase chromatography (column) to give 29.5 g. (58%) of a colorless liquid product of 3-carbethoxy-2-ethyl-3-trifluoroacetylpropionaldehyde.

Example 8

A mixture of 8.6 g. (0.2 mole) of a 56% oil dispersion of sodium hydride in 100 ml. of dry benzene is stirred under anhydrous conditions during the addition of 36.8 g. (0.2 mole) of ethyl trifluoroacetoacetate (15 minute addition period). After heating to reflux for 30 minutes, the benzene is removed in vacuo and 100 ml. of dry acetone is added to the residual salt. The addition of a catalytic amount of sodium iodide (0.1 g.) is followed by the dropwise addition of 33.0 g. (0.2 mole) of 2-bromo-3-pentanone. The stirred mixture is heated at reflux temperature for six hours. After pouring the reaction mixture into 300 ml. of ice water, the aqueous phase is extracted with four 100-ml. portions of ethyl ether. The combined extracts are dried over anhydrous magnesium sulfate. After removal of the drying agent by filtration, the filtrate is concentrated by distillation. The residue is purified by vapor phase chromatography (column) to give 34.8 g. (65%) of a colorless liquid product of 3-carbethoxy-4-methyl-1,1,1-trifluoroheptane-2,5-dione.

Example 9

A mixture of 8.6 g. (0.2 mole) of a 56% oil dispersion of sodium hydride in 100 ml. of dry benzene is stirred under anhydrous conditions during the addition of 36.8 g. (0.2 mole) of ethyl trifluoroacetoacetate (15 minute addition period). After heating to reflux for 30 minutes, the benzene is removed in vacuo and 100 ml. of dry acetone is added to the residual salt. The addition of a catalytic amount of sodium iodide (0.1 g.) is followed by the dropwise addition of a solution of 44.6 g. (0.2 mole) of α-bromopropiophenone in 100 ml. of acetone. The stirred mixture is heated at reflux temperature for six hours. After pouring the reaction mixture into 300 ml. of ice water, the aqueous phase is extracted with four 100-ml. portions of ethyl ether. The combined extracts are dried over anhydrous magnesium sulfate. After removal of the drying agent by filtration, the filtrate is concentrated by distillation. The residue is purified by vapor phase chromatography (column) to give 31.6 g. (50%) of a colorless liquid product of 3 - carbethoxy - 2 methyl-3-trifluoroacetylpropiophenone.

Example 10

A mixture of 8.6 g. (0.2 mole) of a 56% oil dispersion of sodium hydride in 100 ml. of dry benzene is stirred under anhydrous conditions during the addition of 36.8 g. (0.2 mole) of ethyl trifluoroacetoacetate (15 minute addition period). After heating to reflux for 30 minutes, the benzene is removed in vacuo and 100 ml. of dry acetone is added to the residual salt. The addition of a catalytic amount of sodium iodide (0.1 g.) is followed by the dropwise addition of a solution of 33.6 g. (0.2 mole) of 1 - chloro - 1 - phenylacetone in 100 ml. of dry acetone. The stirred mixture is heated at reflux temperature for six hours. After pouring the reaction mixture into 300 ml. of ice water, the aqueous phase is extracted with four 100-ml. portions of ethyl ether. The combined extracts are dried over anhydrous magnesium sulfate. After removal of the drying agent by filtration, the filtrate is concentrated by distillation. The residue is purified by vapor phase chromatography (column) to give 36.7 g. (58%) of a colorless liquid product of 3 - carbethoxy - 4 - phenyl-1,1,1-trifluorohexane-2,5-dione.

The vapor phase chromatography columns of Examples 4–10 are 5% SE–30 (a resin sold by the General Electric Company) on Gas-Chrom Z (a firebrick support sold by Applied Science Laboratories, Inc.) and 5% of diethylene glycol succinate on Gas-Chrom Z.

What is claimed is:
1. A compound of the formula:

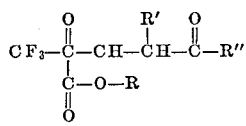

wherein R is a member selected from the group consisting of lower alkyl, phenyl, naphthyl, phenylalkyl having 7 to 14 carbon atoms, and naphthylalkyl having 11 to 14 carbon atoms; and each of R' and R" is a member selected from the group consisting of hydrogen, lower alkyl, cyclohexyl, phenyl, benzyl, phenylethyl and phenylpropyl.

2. A compound of claim 1 wherein each of R and R" is lower alkyl and R' is hydrogen.
3. A compound of claim 2 wherein R" is methyl.
4. 3-carbethoxy-1,1,1-trifluorohexane-2,5-dione.
5. 3-carbethoxy - 4 - methyl - 1,1,1 - trifluorohexane-2,5-dione.
6. Ethyl 3 - benzoyl - 3 - phenyl - 2 - trifluoroacetylpropionate.
7. 3-carbethoxy-3-trifluoroacetylpropionaldehyde.
8. 3-carbethoxy - 4 - methyl - 1,1,1 - trifluoroheptane-2,5-dione.
9. 3-carbethoxy - 2 - methyl - 3 - trifluoroacetylpropiophenone.
10. 3-carbethoxy - 4 - phenyl - 1,1,1 - trifluorohexane-2,5-dione.

References Cited

Dann et al.: Chem. Berichte, vol. 85, pp. 457–461, 1952.

LORRAINE A. WEINBERGER, *Primary Examiner.*

T. L. GALLOWAY, *Assistant Examiner.*

UNITED STATES PATENT OFFICE
CERTIFICATE OF CORRECTION

Patent No. 3,405,163   October 8, 1968

Ronald E. Bambury et al.

It is certified that error appears in the above identified patent and that said Letters Patent are hereby corrected as shown below:

Column 7, lines 23 to 28, the formula should appear as shown below:

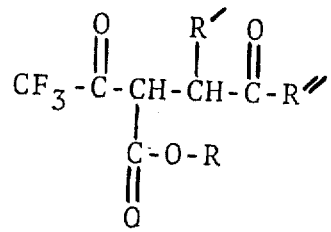

Signed and sealed this 24th day of February 1970.

(SEAL)
Attest:

Edward M. Fletcher, Jr.
Attesting Officer

WILLIAM E. SCHUYLER, JR.
Commissioner of Patents